(12) United States Patent
Myer, Sr.

(10) Patent No.: US 6,612,500 B2
(45) Date of Patent: Sep. 2, 2003

(54) SEPARATOR CARD

(75) Inventor: David E. Myer, Sr., Lexington, MA (US)

(73) Assignee: Giesecke & Devrient America, Inc., Bedford, MA (US)

(*) Notice: Subject to any disclaimer, the term of this patent is extended or adjusted under 35 U.S.C. 154(b) by 101 days.

(21) Appl. No.: 09/877,111

(22) Filed: Jun. 11, 2001

(65) Prior Publication Data

US 2001/0050247 A1 Dec. 13, 2001

Related U.S. Application Data

(60) Provisional application No. 60/210,827, filed on Jun. 12, 2000.

(51) Int. Cl.$^7$ ............................................. G06K 19/06
(52) U.S. Cl. ..................................................... 235/493
(58) Field of Search ................. 235/375, 380, 235/449, 462.01, 487, 493, 494; 194/206, 207

(56) References Cited

U.S. PATENT DOCUMENTS

| | | | |
|---|---|---|---|
| 4,066,873 A | | 1/1978 | Schatz |
| 4,609,812 A | * | 9/1986 | Drexler ........................ 81/383 |
| 4,863,196 A | | 9/1989 | Ohnishi et al. |
| 5,237,164 A | * | 8/1993 | Takada ........................ 235/487 |
| 5,270,526 A | | 12/1993 | Yoshihara |
| 5,337,361 A | * | 8/1994 | Wang et al. .................... 380/51 |
| 5,616,911 A | * | 4/1997 | Jagielinski .................... 235/493 |
| 5,624,017 A | * | 4/1997 | Plesko ........................ 194/207 |
| 5,661,289 A | | 8/1997 | Sasou |
| 5,714,743 A | | 2/1998 | Chiba et al. |
| 5,917,930 A | | 6/1999 | Kayani et al. |
| 5,984,191 A | * | 11/1999 | Chapin, Jr. ................... 235/493 |
| 6,029,895 A | * | 2/2000 | Ito et al. ...................... 235/493 |
| 6,116,507 A | * | 9/2000 | Fukuda et al. ................ 235/454 |

* cited by examiner

Primary Examiner—Karl D. Frech
Assistant Examiner—Edwyn Labaze
(74) Attorney, Agent, or Firm—Bacon & Thomas, PLLC

(57) ABSTRACT

A separator card substrate material for use in high speed document processing machines is imprinted with an array of periodically laterally spaced magnetic strips across an area of the face of the substrate and furthermore a machine readable code array of light and dark blocks representing selected data is imprinted in at least a portion of the same space of the substrate as is occupied by the magnetic strips with the light and dark blocks spanning widthwise dimensions between the strips as well as lengthwise dimensions between the strips. The interleaving of the magnetic strips and the light and dark blocks enables the separator card to be encoded with relatively large fields of optical data enabling the use of low resolution sensors for detecting the optical data used to uniquely identify each separator card without interfering with the function of the magnetic strips.

7 Claims, 2 Drawing Sheets

SEPARATOR CARD

This application claims the benefit of Provisional patent application Ser. No. 60/210,827 filed Jun. 12, 2000.

BACKGROUND OF THE INVENTION

1. Field of the Invention

This invention relates to separator cards usable with currency and other document processing, identification, sorting and counting machines.

2. Description of Related Art

High speed, continuous processing of paper of value (e.g. bank notes or currency) as well as checks and other documents using machines that scan the documents, recognize differences and discriminate between the documents, and count and sort the documents typically use a separator sheet between batches of documents to enable the machine to continuously process the different batches of documents without commingling the documents or data related to the documents. Such separator sheets, typically called separator cards, are interleaved between the separate batches of documents to be processed and contain machine readable indicia or codes that enable various sensors within the machine to recognize the separator card, read data on the card, and discriminate the separator card from the documents being processed.

High speed document processing machines of the type described above typically contain sensors and software that enable the machine to sense and identify various information or data associated with the documents as well as the separator cards. Such sensors, for example, include devices that measure physical properties of the documents (e.g., thickness sensors), optical character recognition systems, magnetic sensors for detecting magnetic coded information provided on or in the documents, bar code scanners and magnetic character reading systems.

It is highly desirable that the various batches of documents to be processed through such machines be maintained in discrete bundles or batches so that the data derived from each batch may be processed within the machine to provide reports reflecting various information desired concerning the respective batches of documents. For example, if the documents comprise currency, each batch of currency may comprise an individual account deposit that is to be counted, sorted and credited to an individual account without substantial human intervention. The processing of the currency, for example, may be carried out by a commercial bank, a central bank or within a private or public enterprise, such as a gambling casino or municipal transit authority. Separator cards are useful to enable the machine to discern the beginning and end of individual batches of documents and a description of such a system, including a separator card configuration is disclosed in U.S. Pat. No. 5,917,930 granted Jun. 29, 1999. Reference may be made to this patent for a further description of a representative application of separator cards in high speed currency processing machines.

In accordance with known principles, separator cards should be recognizable using various sensors already provided in the document processing equipment and furthermore, in the event of a misfeed resulting in both a separator card and a document being fed simultaneously through the machine sensors, it is desirable that the sensors will discern the presence of the separator card even though it may be covered by such document. Typically, this is accomplished by using magnetic sensors to detect magnetic strips imprinted or otherwise provided on the separator card in a pattern or array that enables the sensors to recognize the presence of the separator card not withstanding the fact that it is covered by an opaque layer constituted of the misfed document.

The aforesaid U.S. Pat. No. 5,917,930 describes a prior art system for detecting a separator card in the event of a misfeed when a document (currency) covers a separator card during processing of separate batches of documents.

In addition to the magnetic strips, it is desirable to imprint separator cards with other machine readable codes or characters that represent useful data for machine processing of the documents and for discriminating the separator cards. At minimum, it is desirable to provide an imprinted numeric (or alpha-numeric) code on the separator cards that is unique to each card to enable the processing machine to identify a batch of documents that accompanies a separator card with associated data obtained from the documents among the respective batches of documents being processed. The specific separator card identifier may be imprinted in the form of a bar code, a set of characters that may be recognized by optical character recognition (OCR) equipment or magnetic character recognition systems. The separator card typically will be imprinted with other indicia indicating the orientation of the separator card as well as providing reference points that may be discerned by the various sensors of the document processing machine.

Modern document processing machines, particularly currency processing machines, operate at very high speeds with the result that various sensors used to detect, discriminate and recognize data contained in the documents must be capable of detecting and processing information extremely rapidly as well as extremely accurately. The need for high speed recognition of data, particularly optically captured data, requires very costly and sophisticated detection systems capable of providing input information to the processing software used in such machines with virtually negligible error rates. For this reason, such document processing machines tend to be costly and complex.

It is highly desirable to reduce the cost in complexity of document processing machines, particularly currency processing machines, and the present invention has as an objective the simplification of detecting and reading optically visible code information on separator cards of the type described above to thereby enable the use of less costly and less sensitive optical reading and code recognition devices to identify an individual separator card while still enabling high speed continuous processing of batches of documents separated by the separator cards that each having a unique card identifier imprinted thereon.

Generally, the larger the coded information imprinted on a document the easier it is to be detected by optical viewing and image capturing systems. Such large codes therefore are desirable to enable the use of simpler, less costly optical scanner systems, including lower resolution scanners. The problem arises, however, in that a separator card has limited space for imprinting large blocks of code thereon, particularly when a substantial portion of the separator card is imprinted or otherwise contains an extensive array of magnet strips used for detecting the separator card during high speed document processing.

Given that separator cards typically require imprinting on a single face thereof the unique card identifier (typically a multi-digit numerical sequence) and given that a bar code also must be imprinted on the same face of the separator card, a problem arises in finding a location on the card for a relatively large array of optically recognizable coded information that is machine readable during high speed processing of batches of documents and their respective separator cards. The present invention has as its objective a solution to such problem.

BRIEF SUMMARY OF THE INVENTION

The present invention contemplates a separator card having an array of periodically laterally spaced magnetic strips imprinted thereon across a surface area of a separator card substrate that may be recognized and sensed by magnetic sensing device contained within a document processing machine. In addition, the invention contemplates using an array of relatively large light and dark blocks arranged in a machine readable code format wherein the blocks are disposed between and fully span the distance between the magnetic strips, as well as at least part of the distance lengthwise between the strips. Thus, the invention permits both the magnetic strips and the large block optical code array to be interleaved in a compact manner over the same area of a separator card. Because the array of light and dark blocks of optically recognizable data does not interfere with the underlying magnetic strips, separate sensors may be utilized to detect the magnetic strips and the blocks of code without interfering with any sensing of the respective magnetic and optical data.

DESCRIPTION OF THE DRAWINGS

The invention is described in more detail in the following description in conjunction with the appended drawings, wherein.

DETAILED DESCRIPTION OF A PREFERRED EMBODIMENT OF THE INVENTION

Figure 1:
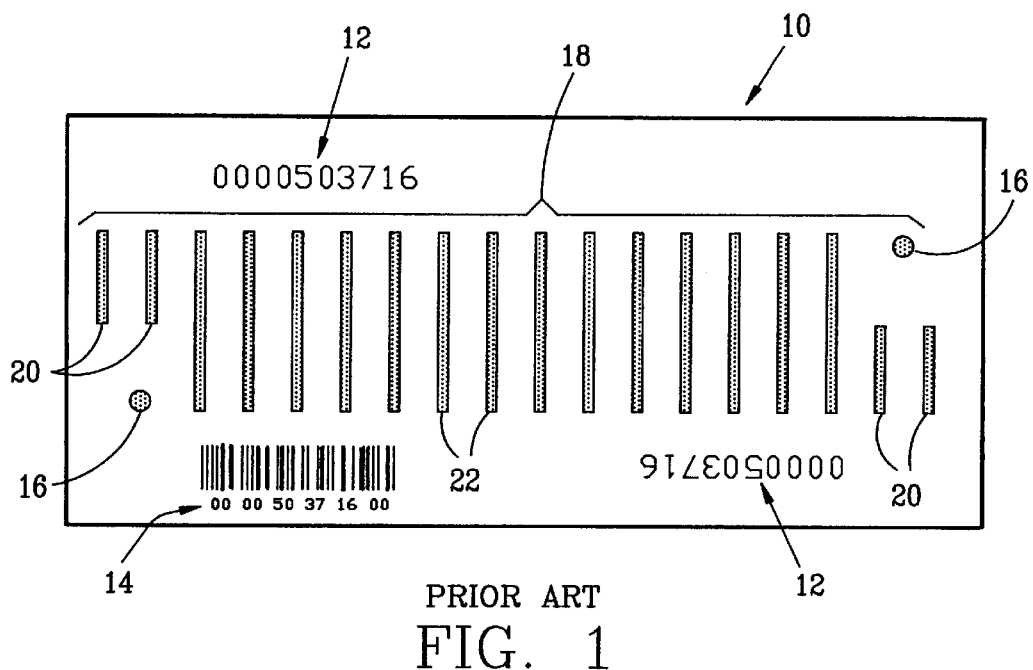
FIG. 1 shows a single face of a separator card configured in accordance with prior art.

FIG. 1 shows a face of a separator card 10 adapted for separating batches of documents such as currency and bank notes during high speed machine processing of the documents. The substrate constituting the separator card may be constituted of paper stock of various weights and finishes and typically is dimensioned to be approximately the same size as the documents to be separated. The opposite face of the separator card may contain similar or different information, but typically will be imprinted with a bar code and a numerical sequence of digits similar to the face of the card shown in FIG. 1, wherein the numerical series of digits 12 represent a unique identifier for each separator card.

The illustrated face of the separator card 10 includes a bar code 14, for example a uniform product code (UPC) that is configured to represent the same numerical information as the data 12 imprinted on the face of the card 10. The separator card shown in FIG. 1 also contains indicia 16 imprinted thereon that may be utilized by the processing machine to identify the location of the header card as it moves through the sensing system of the machine and to provide early notice to the sensors of the processing machine that coded information is approaching the sensors.

An array of periodically spaced strips 18 is imprinted on the face of the separator card 10, the strips constituting short strips 20 and longer strips 22. The short strips 20 are located at opposite ends of the array while the longer strips 22 are located between the shorter strips 20. The strips 20,22 are preferably imprinted using magnetic ink and are disposed across the face of the separator card 10 in a periodic array of evenly spaced strips or bars. The use of magnetic ink is preferred because the array can be imprinted economically and reasonably precisely on the face of the separator card. The specific orientation and location of the magnetic strip array 18 is configured to enable the strips to be sensed by magnetic sensors used in the document processing machines with which the separator cards are used. The array of magnetic strips enables the card to be sensed by magnetic sensors contained within the document processing machine irrespective of whether or not the card may be skewed relative to the sensors and also irrespective of whether or not an opaque document overlies the separator card due to a misfeed condition during document processing.

Figure 2:
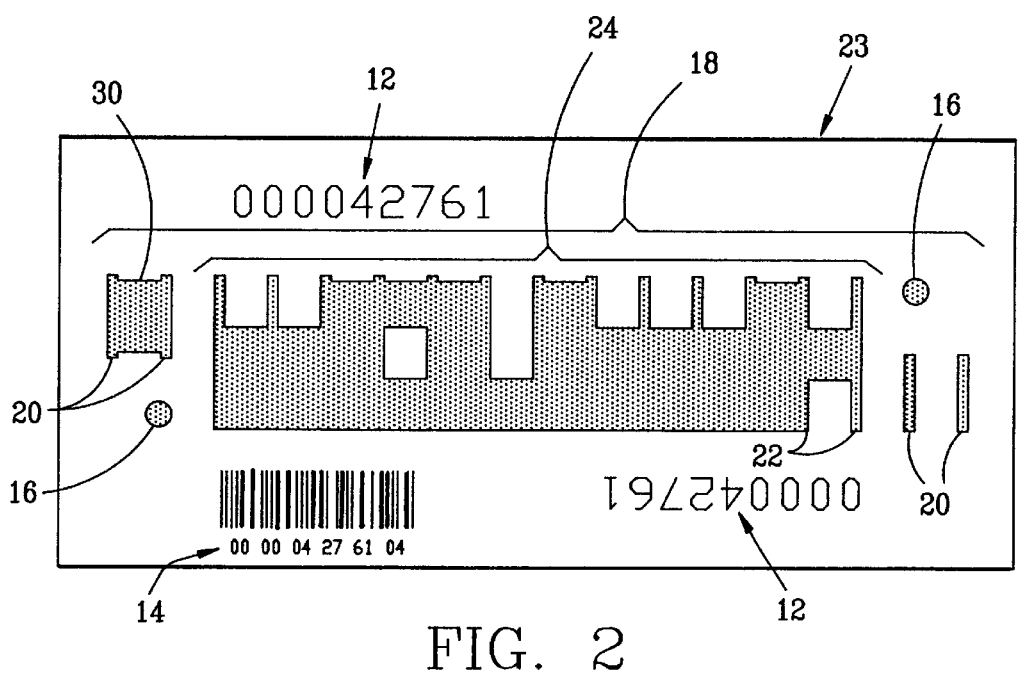
FIG. 2 illustrates a separator card configured in accordance with the present invention.
Figure 3:
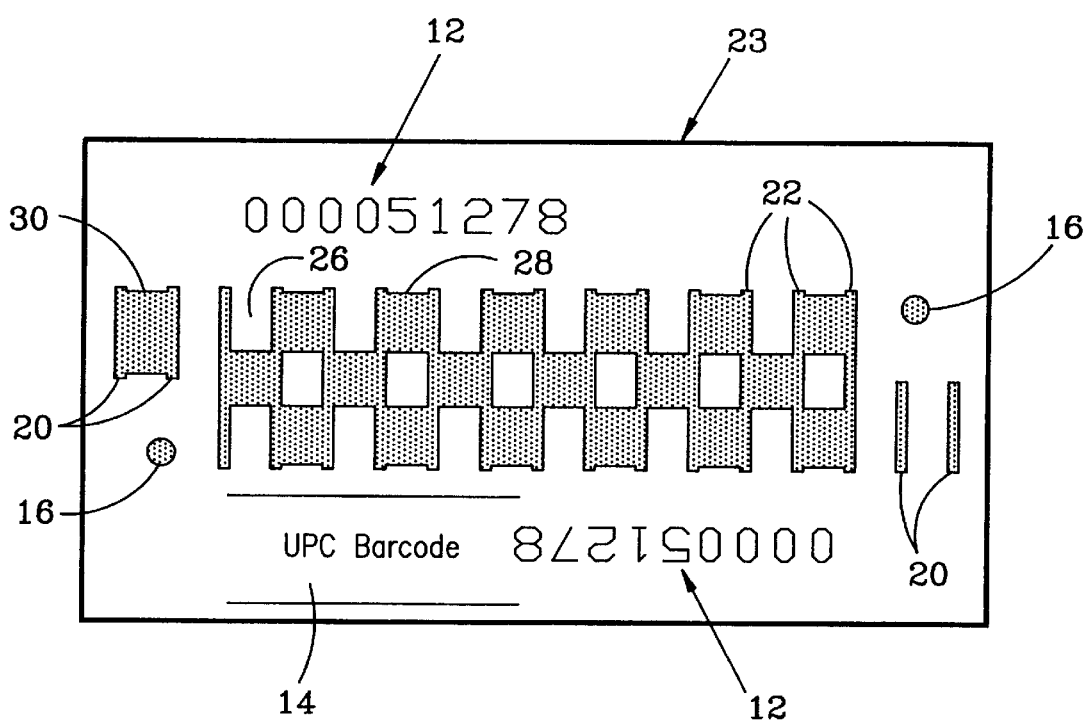
FIG. 3 illustrates that arrangement of the data block array in a manner enabling observation of the location of each data block between magnetic strips.

FIG. 2 shows a separator card 23 according to the invention, wherein a light and dark block code array 24 is interleaved with the magnetic strip array 18. The blocks 24 are disposed in three rows as shown in FIG. 3 wherein each block spans a lateral distance between the longer magnetic strips 22 over a portion of the lengths of the strips and a group of three blocks spans the lengthwise distance between longer magnetic strips 22. The blocks 24 include light blocks 26 and dark blocks 28 arranged in three rows spanning the lengthwise dimension of each longer magnetic strip 22 (although they need not necessarily span the entire distance). In the example illustrated in FIGS. 2 and 3, there are thirteen longer strips 22 and twelve spaces or gaps between the magnetic strips 22. Because there are three rows of light and dark blocks 26,28, each array of light and dark blocks produces an easily recognizable 36-bit array of information dependent upon the specific arrangement of light and dark blocks. For example, as shown in FIG. 2, the distance between adjacent magnetic strips 22 may be entirely filled with dark blocks or only partially filled with such dark blocks. In the illustrated example, the substrate of the separator card 10 is light in color and the dark blocks are imprinted thereon using easily recognizable dark ink. The light blocks typically would represent a "0" while the dark blocks would represent a "1". Thus, the optically sensed array of light and dark blocks may be readily converted into a digital 36-bit stream of digital information convertible into a unique card identifier number by appropriate well-known computer software.

The relatively large sizes of the light and dark blocks 26,28 enable the blocks to be detected and optically sensed by relatively low sensitivity or resolution optical scanning equipment despite relatively rapid motion of the separator card past the optical sensing system. The use of relatively low resolution optical sensors results in simplification and reduction in cost of the optical separator card identifier system as compared with prior art systems.

The interleaving of light and dark blocks 26,28 with magnetic strips 22 enables the use of the magnetic strips 22 to define the edges of the light and dark blocks when the magnetic strips 22 are imprinted in a dark color on the substrate of the separator card 23. Preferably, a dark block 30 located so that it spans two short magnetic strips 20 may be provided towards one end of the separator card as shown in FIGS. 2 and 3. Again, the dark block 30 is interleaved and spans the short magnetic strips 20.

In an alternative embodiment of the separator card, the separator card can be adapted to be used in conjunction with specially issued documents resembling currency or other value units. Examples include scrip or coupons issued by casinos for redemption at various points of service at the casino. The separator card can be arranged with at least one overprinted image that covers the magnetic strips and light/dark blocks. The overprinted image, however, is printed in non-magnetic ink so that it does not interfere with the machine sensors specialized for detecting data from the magnetic strips and light/dark blocks.

Various configurations and shapes of magnetic strips and light/dark blocks can be envisioned in accordance with the invention and the shape and configuration of the magnetic and block arrays described above is intended to be exemplary only. The important feature of the invention is the interleaving of the light/dark blocks with the magnetic strips whereby the magnetic strips essentially frame the blocks without interfering with the periodicity of the magnetic strips or otherwise interfering with the ability of magnetic sensors to detect the magnetic strips. While three rows of light/dark blocks are illustrated in accordance with the preferred embodiment, any number of rows, including a single row, could be utilized in accordance with the invention. It should also be understood that the sensing of the light/dark blocks in combination with the sensing of the magnetic strips could be utilized in conjunction with appropriate software to capture specific desired data related to the separator card and its associated unique identifier.

Accordingly, the invention is not to be interpreted as restricted to the specific exemplary embodiment described herein, but fully extends to the scope of the claims appended hereto.

I claim:

1. A substrate having a machine readable code and an array of periodically laterally spaced magnetic strips imprinted in a dark color thereon wherein the machine readable code comprises light and dark colored machine readable blocks arranged in a code array corresponding with selected data, and further wherein the blocks are each disposed between and fully span a lateral distance between adjacent magnetic strips.

2. A substrate as claimed in claim 1, including a machine readable bar code exhibiting the same selected data as the code array.

3. A substrate as claimed in claim 2, including a visible numeric field of imprinted data corresponding to the selected data represented by the code array.

4. A substrate as claimed in claim 1, including at least one machine readable orienting code imprinted on the substrate on the same face of the substrate whereon the magnetic strips and the light and dark colored machine readable blocks are imprinted, and separate from the magnetic strip and the light and dark colored machine readable blocks.

5. A substrate as claimed in claim 1, wherein the substrate is light in color and the machine readable dark colored blocks comprise imprinted blocks and the light colored blocks comprise non-printed areas of the substrate.

6. A substrate as claimed in claim 1, wherein the magnetic strips each have a length dimension and the light and dark machine readable blocks are arrayed in at least two rows extending along the lengthwise dimensions of the magnetic strips.

7. A substrate as claimed in claim 1, wherein the substrate includes at least one image overprinted with non-magnetic ink over said light and dark colored machine readable blocks and said magnetic strips, said overprinted image being invisible to sensors capable of reading said machine readable blocks.

* * * * *